United States Patent [19]

Francart, Jr.

[11] Patent Number: 4,745,944

[45] Date of Patent: May 24, 1988

[54] SELF-CLEANING, FLUID PRESSURE BIASED GATE VALVE

[76] Inventor: Armand Francart, Jr., R.D. 2, Box 119Z, Landenberg, Pa. 19350

[21] Appl. No.: 108,673

[22] Filed: Oct. 15, 1987

[51] Int. Cl.$^4$ .......................... B08B 3/00; B08B 9/06; F16K 1/18

[52] U.S. Cl. ................. 137/238; 134/166 C; 251/177; 251/214; 251/301; 277/110; 277/111; 277/112

[58] Field of Search ............. 134/166 R, 166 C; 137/238, 240; 251/177, 178, 193, 214, 298, 301, 302; 277/105, 106, 110, 111, 112

[56] References Cited

U.S. PATENT DOCUMENTS

| | | | |
|---|---|---|---|
| 10,557 | 2/1885 | Lunkenheimer | 251/301 |
| 1,991,006 | 2/1935 | Wilson | 251/177 |
| 2,097,943 | 11/1937 | Zagorski | 251/214 |
| 2,443,929 | 6/1948 | Patterson | 251/302 |
| 2,991,794 | 7/1961 | Harrower | 251/301 |
| 3,442,285 | 5/1965 | Faustin | 137/240 |
| 3,916,943 | 11/1975 | Hester | 251/214 |
| 4,274,432 | 6/1981 | Tunstall et al. | 137/315 |
| 4,455,864 | 6/1984 | Wallner | 277/110 |

Primary Examiner—George L. Walton

Attorney, Agent, or Firm—Sughrue, Mion, Zinn, Macpeak, and Seas

[57] ABSTRACT

A drive shaft mounted for rotation about its axis within a gate valve casing terminates, internally within a valve chamber, in a radial arm which couples to a valve disk. The disk seats on the valve casing and is movable between an overlying position relative to an outlet part and an angularly displaced position such that the outlet port is wholly uncovered. A valve inlet port is aligned with the shaft, on the opposite side of the radial arm and the shaft is extended by a hollow, open frame cylindrical cage which terminates in a ring rotably mounted to the valve casing about the inlet port. The cage ring is connected to the bottom of the arm in line with the shaft via multiple, circumferentially spaced, feed fins forming radial windows permitting the inlet flow to be deflected radially with the shaft dissipating the force of the incoming fluid. The feed fins purge the valve chamber when rotating during valve opening and closing. A bushing rotatably supporting the cage acts in conjunction with other annular bushings concentrically mounted about the periphery of the drive shaft for maintaining alignment of the shaft cage and arm and resisting deflection of the shaft of the valve actuator assembly during valve opening and closing.

13 Claims, 3 Drawing Sheets

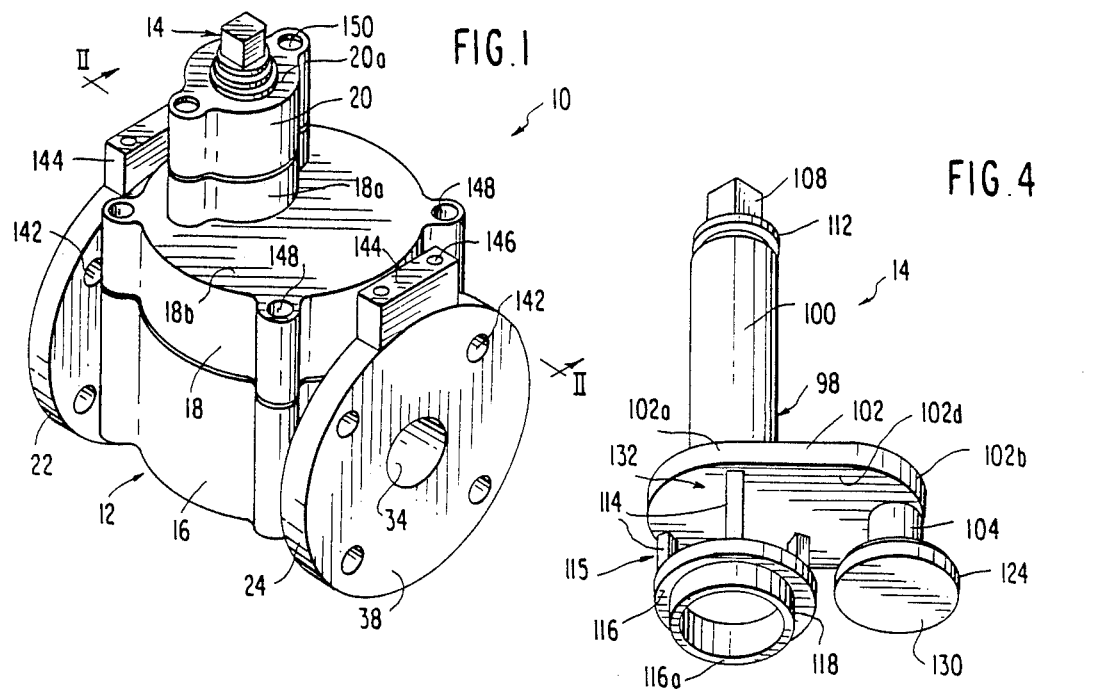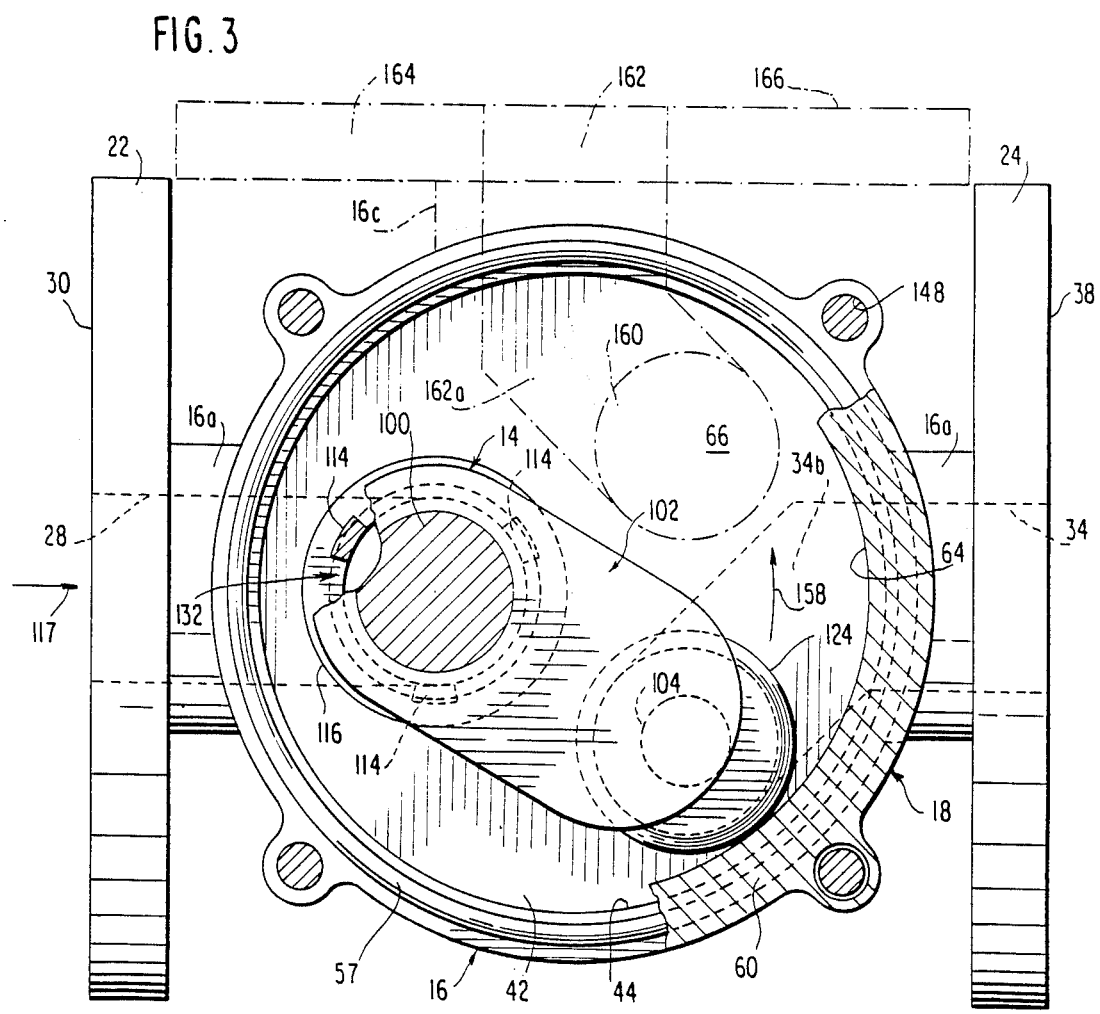

SELF-CLEANING, FLUID PRESSURE BIASED GATE VALVE

FIELD OF THE INVENTION

This invention relates to gate valves of the type wherein a shaft mounted rotating arm carries a valve disk which is moveable at right angles to the outlet port from valve closed, overlying position to valve open position and more particularly, to such a gate valve where the dynamic forces due to the inlet flow of the controlled fluid act axially through the drive shaft and wherein, the fluid flow into the valve casing chamber purges the valve body with the valve open or closed.

BACKGROUND OF THE INVENTION

Gate valves have evolved over the years in several forms including a basic form wherein a drive shaft, projecting into an interior chamber of a valve casing and mounted for rotation about its axis has fixed thereto, a radially projecting arm and wherein, by a ball and socket (orthagonal) mount, a circular valve disk, carried by the arm, is placed in surface contact with the valve casing so as to overlay a circular outlet port. Rotation of the shaft causes the arm to swing and thus move the disk to the side to permit fluid flow from an inlet port in the valve casing, through the chamber carrying the arm and valve disk, to exit through the outlet port. The inlet and outlet ports may be located coaxially on opposite sides of the housing. Further, typically the controlled flow is permitted to fill the chamber and to provide a force on the opposite side of the valve disk tending to maintain the valve disk sealed on the valve seat surrounding the outlet port, during valve closure. Representative U.S. patents directed to such gate valves are U.S. Pat. Nos. 10,557; 1,991,006; 2,443,929 and 2,991,794.

Problems have been experienced particularly where the controlled flow includes particulate matter capable of clogging the chamber, thereby preventing the valve disk from seating adequately when overlying the outlet port and shift to normal, valve closed position. Further, the placement of the inlet port relative to the shaft mounting the arm or the other rotatable components of the valve, creates a problem when the forces developed by the flow of fluid controlled by the gate valve, impinges against these operating components. Bending forces may develop, under certain conditions, on the arm remote from the pivot axis as defined by the drive shaft.

It is therefore a primary object of the present invention to provide an improved gate valve in which the force of the flow entering the chamber housing, is dissipated without deflection of the radial arm or misalignment of the valve disk carried thereby relative to the outlet port, wherein the valve chamber carrying the gate valve disk is purged by the incoming flow during the valve opening or closing and wherein, the incoming flow of fluid through the inlet port is deflected radially of the drive shaft arm into the chamber without bending movements being applied to the shaft, or to the arm fixed to shaft and supporting the valve disk at its outboard end.

BRIEF DESCRIPTION OF THE DRAWINGS

FIG. 1 is a perspective view of the improved gate valve forming a preferred embodiment of the invention.

FIG. 3 is a transverse sectional view thereof taken about line III—III of FIG. 2.

FIG. 4 is a perspective view of the rotary valve body forming a principle element of the gate valve of FIGS. 1-3 inclusive.

DESCRIPTION OF PREFERRED EMBODIMENTS

Figure 2:
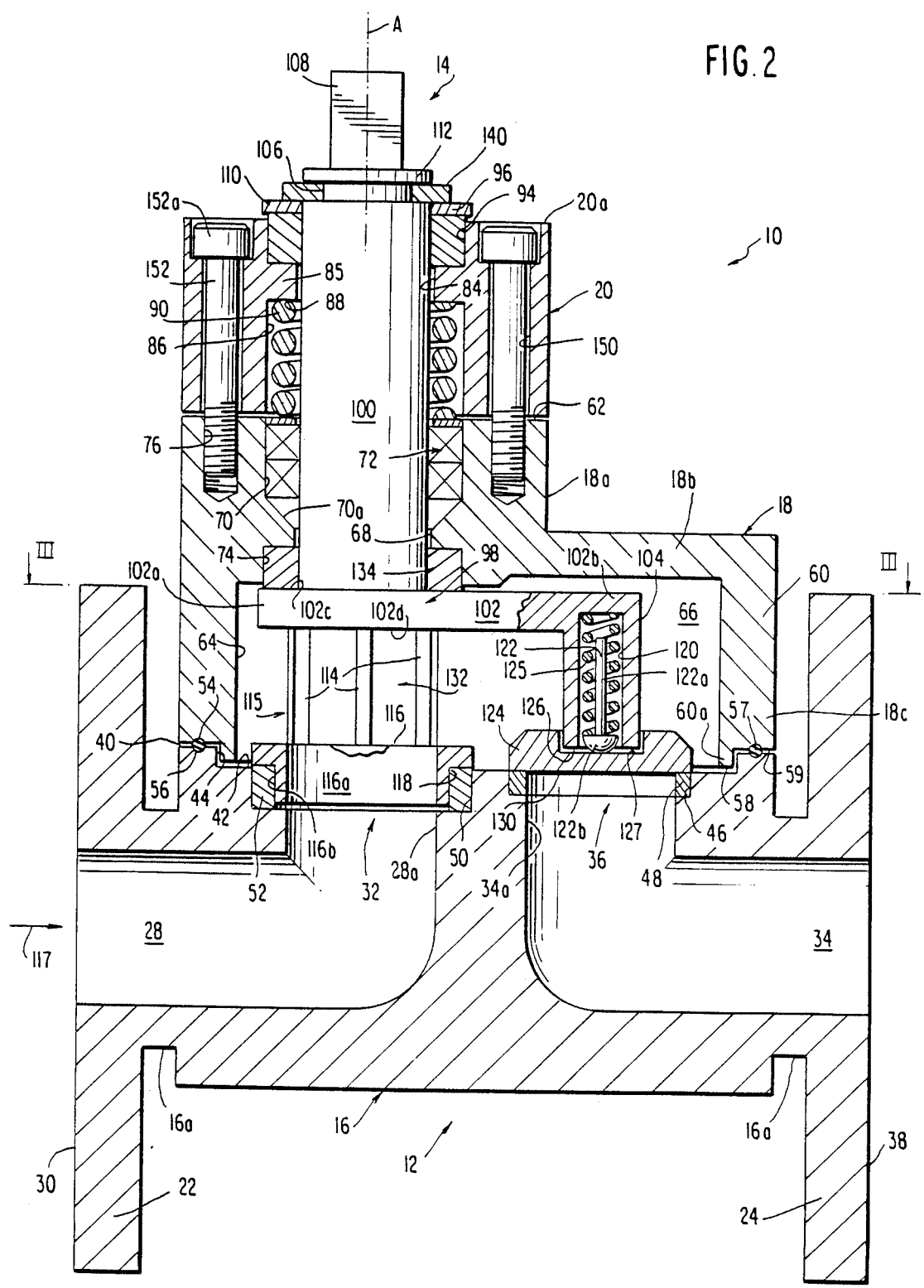
FIG. 2 is a vertical sectional view of the gate valve of FIG. 1 taken about line II—II.

Referring to the drawings, as seen in FIG. 1, the improved gate valve, in one form and indicated generally at 10, is formed principally of an external valve housing or casing, indicated generally at 12, within which mounts, a rotatable valve actuator assembly indicated generally at 14. The valve casing 12 consists of a lower, casing section 16, and an upper casing section 18 mounted thereon, including an integral reduced diameter portion 18a, which is portion 18a eccentric to the upper casing section proper and supports a screw mounted cap or cover 20 of similar transverse cross section.

The gate valve 10, as shown, is vertically oriented with the casing 12 vertically upright of cylindrical form. Casing 12 includes diametrically opposed inlet and outlet flanges 22, 24, respectively for coupling to an intake pipe (not shown) and an outlet pipe (not shown), via bolt holes 142.

The improved gate valve is preferably motor driven through an appropriate electric motor or other actuator (not shown) mounted physically on top of the gate valve casing 12, seated on actuator mounting pads 144, mounted on respective inlet and outlet flanges 22, 24. Screws holes 146 facilitate the mounting of the electric motor or other actuator on pads 144. Further, screw holes 148 extend into and through upper casing section 18 from the flat top surface 18b, thereof adjacent to the reduced diameter section 18a of that casing section. Screws (not shown) couple the upper casing section 18 to lower casing section 16. Further, holes 150 within the cap or cover 20 from the upper face 20a thereof, extend to axially aligned tapped holes 76 within the reduced diameter portion 18a of the upper casing section 18 and carry screws (not shown) for sealably coupling the cover 20 to the reduced diameter portion of the upper casing section 18a. Aligned bores are formed within the lower casing section 16 forming an inlet flow passage such as 28 at inlet flange 22, and an outlet flow passage 34 within the outlet flange 24.

From FIGS. 2, 3 and 4, the details internally of the improved gate valve 10 may be appreciated. In that respect, the cast metal lower casing section 16 includes radial, circular projections 16a which are in turn radially enlarged to define respective flanges 22, 24. The flange end faces at 30, 38 permit flush mounting to corresponding flanges of the inlet pipe and outlet pipe (not shown). Pipe connections are made via four bolt holes 142 with the flanges 22, 24, at locations corresponding to those within the inlet and outlet pipe flanges. The lower casing section 16 includes a flat, horizontal top surface 40 having a large diameter circular recess 42, to define an annular shoulder 44. Further, within the recess 42, there is provided a small diameter circular recess 46, within which mounts an annular ring or valve seat 48 which may be of different metal to that forming the valve casing 12. Adjacent to the annular recess 46, is a further circular recess 50. Further, the lower casing section 16 horizontal inlet passage 28 extending inwardly from inlet flange outer face 30 towards the center the valve casing 12 terminates in a right angle vertical inlet passage portion 28a opening to the recess 50 and defining a valve inlet port 32. Diametrically opposite inlet passage 28 is an outlet passage 34. The outlet passage 34 has an oblique middle portion 34b, FIG. 3 and terminates inwardly from face 38 of outlet flange 24 in a right angle vertically upward outlet passage portion 34a defining a valve outlet port 36, at seat 48. A metal ring member 52 sized to the recess 50 and having an internal diameter which is larger than the diameter of the inlet bore cross section is mounted within the recess 50 with the height of the ring 52 being such that its upper edge is flush with circular recess 42 formed within the top face 40 of the lower main casing section 16.

The valve lower casing section 16 receives complementary, cylindrical upper casing section 18, whose lower portion 18c has the same outer diameter as that of the lower casing section 16. It also may be of cast metal, and formed with a lower cylindrical wall 60 having a lower end face 58 which is recessed at 59, at the outer periphery thereof, to form an annular projection 60a which fits into recess 42 within the top face 40 of the lower main casing section 16. Additionally, within recess 59 and within the top face 40 of the upper main casing section 18 cylindrical wall 60 are facing annular grooves 54, 56, respectively. An O-ring 57 is mounted therein to seal the connection between the upper casing section 18 and the lower casing section 16. The inner periphery 64 of the cylindrical wall 60 defines with the top wall 18b of the upper casing section 18 and the lower casing section 16, a sealed valve chamber 66. Chamber 66 mounts, for rotation about a vertical axis A, the drive shaft 100 of assembly 14. Assembly 14 has machined therein, an integral radial arm 102. A pin 104 integral with arm 102 projects downwardly from the outboard end 102b of that arm, at right angles to the longitudinal axis of the arm. A circular valve disk 124 forms an element of assembly 14.

The upper casing section 18, as stated previously, has a reduced diameter portion 18a eccentric to the axis of the upper casing section proper. Portion 18a thereof, terminates in a flat top surface 62. An axial bore 68 is formed therein as a further upper counterbore 70, adjacent the top surface 62, and lower counterbore 74, at the bottom of portion 18a. Counterbore 74 carries an annular bushing 134 which mounts shaft 100, above arm 102 of the actuator assembly 14. Spring loaded packing 72 fills the upper counter bore 70 and surrounds the drive shaft 100 of assembly 14.

The cap or cover 20 complements the reduced diameter portion 18a of the upper casing section 18. Cap 20 is formed of cast metal or is machined from metal stock and is of generally cylindrical form. It is provided with a bore 84, an upper counterbore 94 and a lower counterbore 86. The counterbore 86 is sized to that at 70. Mounted within the counterbore 86 is a coil spring 90 which biases the packing 72 towards inclined face 70a at the lower end of counterbore 70 tending to drive the packing radially towards the confronting periphery of actuator shaft 100 of drive shaft 100. The bore 84 and counterbores 86 and 94 define a radially inward projecting rim or collar 85 which acts as a stop for the coil spring 90 at radial shoulder 88. Within the cap upper counterbore 94 is mounted a further bushing 96 supporting shaft 100 for rotation about the shaft axis.

As best seen in FIGS. 2 and 3, the actuator assembly 14 which is machined from metal stock, includes the drive shaft 100 which is integral with radially projecting arm 102, with the upper surface 102c of the arm abutting bushing 134. At the upper end of the drive shaft 100, the shaft is provided with an annular groove 106 forming a radial collar 112. A flat washer 110 is carried by the drive shaft 100, beneath the collar 112, and the diameter of the washer 110 is such that is overlies bushing 96. Bushings 96 and 134, act as bearings for the drive shaft 100. A cir clip 140 is snapped into place, overlying the washer 110 and underlying the radially projecting collar 112, and fitted into the annular groove 106. This locks the shaft 100 in place and the actuator assembly 14 in position for proper operation of the gate valve.

The upper end of the drive shaft 100 terminates in a squared portion 108 functioning as a male coupling element to the electric motor or like positive drive (not shown) and supported by the actuator mounting pads 144 to opposite flanges of the improved gate valve 10. For the purpose of simplicity, in FIG. 2, the actuator mounting pads are not shown. In order to complete the assembly, holes are provided at 150 within cap or cover 20, aligned with similar sized tapped holes 76 within the upper face 62 of the reduced diameter portion 18a of the upper casing section 18. Mounting screws 152, FIG. 2, are employed to complete the coupling and are tightened down via slotted heads 152a.

Integral with the radially extending arm 102 at the lateral center thereof, at the outboard end 102b, remote from axis A of the drive shaft 100, is downwardly projecting pin 104. Pin 104 includes an axial bore 120 extending upwardly from the bottom face 126 thereof. Coil spring 125 is fitted within bore 120 and concentrically surrounds a stem 122a of a plunger 122 whose spherical head 122b abuts the center of a circular axial recess 127 within the circular valve disk 124. The lower face 130 of the valve disk, in the position shown in FIG. 2, lies flush with the upper face of valve seat 48.

In the embodiment illustrated, the circular recess 127 within the upper face 128 of the valve disk 124 is of a diameter slightly larger than the outside diameter of pin 104 so that the lower end of the pin is received within the circular disk recess 127. Further, the semi-spherical head 122b of plunger 122 permits orthogonal movement of the valve disk 124 to ensure disk seating on seat 48 when the valve is in valve closed position and permitting some shift in angular orientation with respect to the pin 104 during the limited rotation of the arm 102 from valve closed to valve open position, FIG. 3.

A principal aspect of the present invention resides in the integration of a cage indicated generally at 115 into the rotatable valve actuator assembly 14 as an axial extension of the shaft 100 and the orientation of the inlet flow relative to that cage and particularly the shaft Axis A of the actuator assembly 14.

Specifically, the body 98 of assembly 14 is machined from metal stock or the like, including integrally, shaft 100, arm 102 and pin 104, is further machined to form cage 115. In that respect, in the illustrated embodiment, three circumferentially spaced, thin, rectangular cross section feed fins or struts 114 project downwardly from the inboard end 102a of arm 102, the fins 114 being concentric about the shaft axis A and being coupled, at their lower end, to an annular ring 116. Ring 116 has a reduced diameter portion 116b defined by an annular recess 118 within the outer periphery of ring 116, at the bottom of ring 116. The annular recess, 118 is of a diameter larger than the inner diameter of an annular bushing 52 seated within annular recess or groove 50 within the lower casing section 16. Ring 116 has an inner diameter corresponding to the inlet port 32 as defined by inlet passage vertical portion 28a. The cage 115 is therefore hollow permitting the incoming flow of fluid to impact against the bottom surface 102d of the arm 102 and thus the force of the incoming fluid is absorbed axially by the shaft 100 through the three bushings 52, 134 and 96. Further, the fins or vertical struts 114 define windows at 132 permitting the flow to be deflected from axial to radial. Further, via feed fins 114 and windows 132, the incoming flow and rotation of the cage 115 purges the interior of the valve chamber 66 to prevent valve blockage by solids carried within the flow stream entering the valve as indicated by arrows 117, FIGS. 2, 3.

The invention advantageously arranges for the inlet port 32 to face and to be axially aligned with the lower end of the shaft 100 so that all of the forces of the developed flow are transmitted through the bearings or bushings 52, 134 and 96 rotatably supporting that shaft for rotation about its axis A, in combination with the hollow cage 116. The windows 132 permit radial flow of the incoming flow stream 117 upon deflection by impact with the lower face 102d of the arm 102 at the center of the arm coincident with the axis A of the shaft 100. The presence of the windows allows the feed fins to purge the valve body when the valve is open and closed. The feed fins 114 rotate to facilitate that purging action, further achieved due to the radial deflection of the incoming flow outwardly of the interior of the cage and into the chamber 66 proper. Further, the axial dimensioning of shaft 100, cage 116, the thickness of the arm and the length of pin 104 is such that the spring biasing of the valve disk, 124 is ensured as well as maintenances of the mechanical coupling between the lower end of the pin 104 and the valve disk 124 since that end of the pin is seated within the circular recess 127 within the upper face 128 of that valve disk.

The manner in which the arm rotates 60° from valve closed to valve open position may be seen by reference to FIG. 3. Note arrow 158. Further, the valve 10 may be modified so as to function as an optional 3-way valve. In that respect, the lower valve casing 16 may be cast to provide integrally, a further circular radial extension 16c terminating in a radially enlarged flange 164, with a second outlet passage 162 being formed within a portion of the lower valve casing 16, the second outlet passage 166 being horizontal at flange 164, and including a vertical second outlet passage portion 162a defining, at its upper end, a second outlet port 160. Passage 162 extends inwardly of flange front face 166. Under such conditions the inlet flow is essentially continuous being directed to either to inline outlet passage 34 or outlet passage 162, at 60° thereto, and opening to the common valve chamber 66.

The improved self cleaning, fluid pressure biased gate valve is characterized by a structure in which the incoming flow is through the drive center for the metal seated, sliding valve disk 124 with that metal seated sliding disk readily movable between 60° rotation position where valve open, valve closed or an optional two-way alternative dual valve outlet connection.

Figure 5:
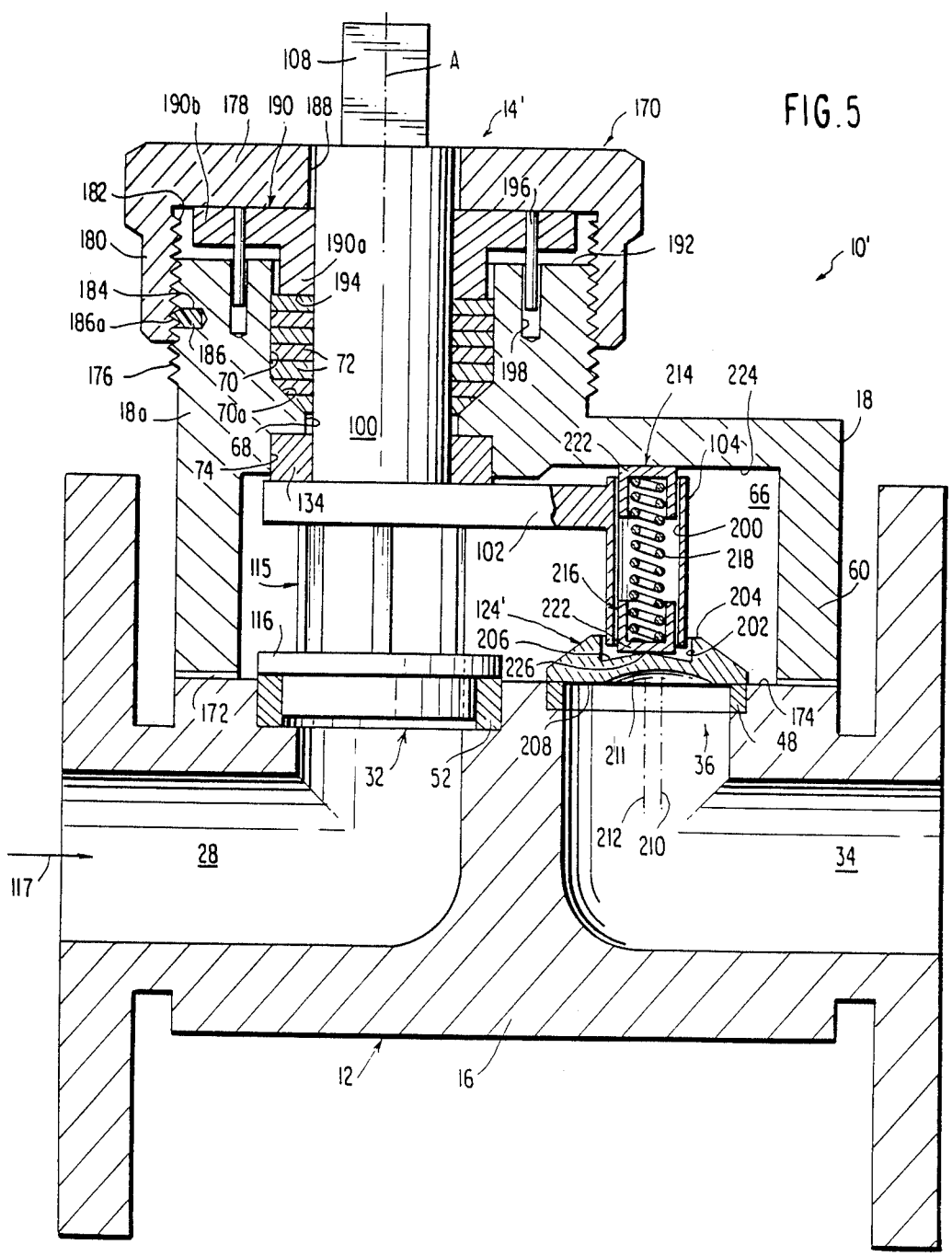
FIG. 5 is a vertical sectional view of a modified gate valve forming a second embodiment of the invention.

Referring to FIG. 5, a second embodiment of the improved gate valve is shown and indicated generally at 10'. In this embodiment, like elements to the embodiment of FIGS. 1 through 4, inclusive are given like numerical designations. The external valve housing or casing indicated generally at 12 mounts a rotatable valve actuator assembly indicated generally at 14' which is slightly modified from that of the first embodiment. The valve casing 12 consist of a lower, casing section 16 and an upper casing section 18 mounted thereon, including an integral, reduced diameter portion 18a which is eccentric to the upper casing section proper. Unlike the prior embodiment, the upper casing reduced diameter portion 18a has threaded thereto a packing adjustment collar indicated generally at 170. Prior to discussing the differences in this embodiment, the major components are essentially identical to those of the first embodiment. In that respect, the cast metal lower casing section 16 is provided with axially aligned inlet and outlet passages 28, 34 which extend from oppositely flanged ends of the lower casing section 16 towards each other, and terminate in right angle, vertical portions to form respectively inlet and outlet ports 32, 36, as in the prior embodiment. Inlet port 32 opens to valve chamber 66 and outlet port 36 leads from that valve chamber. Metal ring member 52 acts as a bearing for an annular ring 116 forming a component of cage 115, the cage 115 being integrally formed, by machining or casting, with drive shaft 100 of assembly 14'. Further, the lower casing section 16 carries a second ring 48 defining a valve seat with its upper surface flush with the top face 174 of the casing section 16, partially defining valve chamber 66. In this case, similar to the first embodiment, an appropriate seal 172 is formed between the upper face 174 of the lower casing valve casing section 16 upon which the lower end of cylindrical wall 60 of the upper casing section 18 abuts. The reduced diameter portion 18a of the upper casing section is provided with an axial bore 68 of a diameter slightly larger than the diameter of the drive shaft 100 passing therethrough and the reduced diameter portion 18a is further provided with an upper counterbore 70 and a lower counterbore 74 as in the prior embodiment. Counterbore 74 carries an annular bushing 134 to rotably mount shaft 100 while counterbore 70 receives packing 72 similar to the prior embodiment. Counterbore 70 terminates at its lower end in a tapered wall portion 70a also receiving the packing 72.

In this embodiment, the packing adjustment collar indicated generally at 170 substitutes for the cap or cover 20 of the prior embodiment. The packing adjustment collar 170 is threaded onto the reduced diameter portion 18a of the upper casing section 18. Threads 176 are provided on the outer periphery of the reduced diameter portion 18a, and the packing adjustment collar 170 is of inverted cup form having a top wall 178 and an integral annular wall 180 whose inner periphery is provided with matching threads 182 such that the packing adjustment collar is screwed down onto the reduced diameter portion 18a of the upper casing section 18. The reduced diameter portion 18a carries a small diameter radial hole 184 within which is positioned a cylindrical block 186 of nylon whose outer radial end face 186a engages, the internal threads 182 of the packing adjustment collar functioning as a substitute for a lock washer for the packing adjustment collar. Further, the packing adjustment collar top wall 178 includes an axial, cylindrical hole 188 slightly larger than the diameter of the drive shaft 100, with the squared end 108 of the shaft projecting axially therefrom. An annular outer bushing 190 or outer bearing of cylindrical form includes a base portion 190a and an upper, radially outwardly projecting rim 190b which has an outer diameter which is less than the inner diameter of the cylindrical flange 180 of the packing adjustment collar 170. The radially projecting rim 190b of the bushing 190 overlies the upper end face 192 of the reduced diameter portion 18a of the upper casing section 18. The outer diameter of the bearing base portion 190a is less than the diameter of counterbore 70. Further, the lower face 194 of bearing base portion 190a abuts packing 72 to compress the packing within counterbore 70 to seal the drive shaft 100, sided by the slope at wall portion 70a at the lower end of counterbore 70. Rim 190b of the bearing 190 has fixed mounted thereto at diametrically opposed positions, depending rods or pins 196 which are received within drilled holes 198 within the upper face 192 of the upper casing section reduced diameter portion 18a, at corresponding diametrically opposed portions. Thus, the pins 196 fitted within the holes 198 function as anti-turn means for the bearing 190 preventing the bearing from rotating with the drive shaft 100 while being shiftable axially with respect to that drive shaft during rotation of the threaded packing adjustment collar 170.

In the embodiment of FIG. 5, there is also several additional modifications of the self cleaning, fluid pressure biased gate valve. Specifically, in similar fashion to the first embodiment, the radial arm 102 which is integral with the drive shaft 100 and part of the rotable valve actuator assembly 14', terminates in an integral right angle hollow pin 104 which projects parallel to cage 115 and is spaced radially outwardly of that cage. The pin 104 is cylindrical as in the prior embodiment, however, in this case it is provided with a throughbore or cylindrical hole 200 whose axis 212 is parallel to the axis A of the drive shaft 100. Like the prior embodiment, the lower end of pin 104 fits within a circular recess 202 within the upper face 204 of a valve disk indicated generally at 124'.

Figure 6:
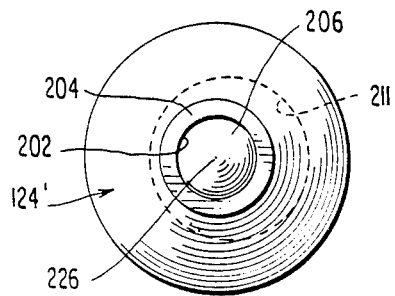
FIG. 6 is a top plan view of the underlying valve disk of the modified gate valve of FIG. 5.

FIGS. 5 and 6 illustrate the makeup of the modified valve disk 124'. Valve disk 134' of this embodiment is generally configured the same as that at 124 in the first embodiment, FIG. 2. It may be seen that recess 202 has a conical bottom face 206, and further, there is an offset spherical cutout or recess 211 in the bottom surface 208 of the valve disk 124', whose axis 210 is laterally offset with respect to the axis of the valve disk 124', which disk axis is aligned with the axis 212 for the pin 104 whose lower end seats within recess 202 of the valve disk. Additionally, a pair of cylindrical cup shaped members or cups 214, 216, having an outer diameter slightly less than the diameter of bore 200 within pin 104, are positioned therein. A compression coil spring 218 is interposed between the cup shaped members 214, 216, whose open ends face each other, and within which cavities 220 thereof, respective ends of the coil spring 218 project. Coil spring 218 is slightly compressed in this state such that respective ends 222 of the upper cup shaped member 214 and the lower cup shaped member 216 abut respectively, the bottom surface 224 of transverse wall 18b of the upper casing section and, center point 226 of the conical bottom wall 206 formed by the recess 202 within valve disk 124'. Due to the presence of the offset spherical cutout, 211, within bottom face 208 of the valve disk, the valve disk 124' is forced to rotate as it cycles between open and closed position with respect to inlet and outlet passages 28, 34 (or if employed in a three way valve) between positions uncovering one outlet or the other. The slight rotation to the disk as it cycles provides even wear on the disk sealing surface found by the outer periphery of disk bottom wall 208. In some respects therefore, the embodiment of FIGS. 5 and 6 is simplified from that of FIGS. 1 to 4 while, in other respects, such as the coupling between the arm born pin 104, it is somewhat more complicated. It performs just as well in maintaining alignment between the center of the disk 124' and the axis 212 of the arm pin 104 while ensuring a slight rotation of the valve disk 124' to provide uniform wear on the sealing surface of the valve disk relative to seat 48 and most importantly, to eliminate a side load of the radial arm 102.

Obviously, many modifications and variations of the present invention are possible in light of the above teachings. It is therefore to be understood that within the scope of the appended claims, the invention may be practiced otherwise than is specifically described herein.

What is claimed is:

1. In a gate valve including a valve casing defining a closed valve chamber, inlet and outlet ports opening to said chamber, a rotatable valve actuator assembly including a drive shaft mounted for rotation about the shaft axis within said casing, said assembly including an arm integral with said shaft and projecting therefrom radially internally within said chamber, a swingable gate valve disk operatively connected to said arm and mounted for movement within said casing between positions covering and uncovering said outlet port, the improvement wherein:

said drive shaft is mounted for rotation within said valve casing to the side of said chamber opposite said inlet port with said shaft aligned with said inlet port, a hollow cage is fixed to said shaft, coaxial therewith and aligned with and facing said inlet port, said cage having at least one radial window whereby fluid flow entering the chamber through said inlet port to said outlet, said flow passes from said inlet axially through said cage and impinges on said actuator assembly coaxially of said shaft, in line with the shaft axis whereby the forces developed by the incoming flow to said chamber are absorbed and dissipated through the shaft while preventing shaft deflection, and said flow deflects radially through the at least one radial window continuously purges the valve chamber when rotated during valve opening and closing.

2. The gate valve as claimed in claim 1 wherein said hollow cage is a cylindrical extension of said shaft, to the side of said arm opposite said shaft and terminates in an annular ring rotatably mounted within said casing to the side of said chamber opposite the side mounting said actuator assembly shaft to facilitate mounting of said shaft for rotation about its axis and preventing shaft deflection as a result of the force of the incoming flow impinging against said actuator shaft assembly.

3. The gate valve as claimed in claim 1 wherein,
said annular ring of said cage is fixed to said arm on the side of said arm remote from said drive shaft by a plurality of circumferentially spaced fins integrated at one end to said arm and at the opposite end to said shaft and forming circumferentially spaced windows there between opening radially to said valve chamber, whereby said fins in rotating during valve opening and closing, facilitates purging of the valve chamber.

4. The gate valve as claimed in claim 1 wherein,
said valve casing comprises a lower casing section of generally cylindrical form including a flat, circular top wall, inlet and outlet passages opening into said lower casing section top wall at side by side positions, annular recesses within said top wall concentrically surrounding said inlet and outlet ports respectively, an annular ring defining a valve seat within said annular recess about said outlet port, a first annular bushing within said annular recess about said inlet port, and said cage ring having an annular recess within the outer periphery thereof on the side of said cage ring facing said inlet port and said ring being seated via said annular recess on said annular bushing so as to rotate thereon, being supported thereby, and facilitating the support of said valve actuator assembly for rotation about the shaft axis within said valve casing.

5. The gate valve as claimed in claim 4 wherein,
said casing further includes an upper casing section of cylindrical form complementary to that of said lower casing section, being an extension thereof, and defining with said lower casing section, said valve chamber, said upper casing section further including a reduced diameter portion, a cylindrical cap sized to and sealably mounted in overlying position on said reduced diameter portion of said upper casing section, and said reduced diameter portion of said upper casing section and said cover having bores of a diameter slightly in excess of the shaft and receiving portions of said shaft, and having upper and lower counterbores above and below the respective bores thereof, a second annular bushing mounted within the lower counterbore within said upper casing section reduced diameter portion above said radially projecting arm, positioned concentrically about said shaft and having an inner diameter on the order of the diameter of said shaft for rotatably supporting said shaft above said arm, and wherein, the upper counter bore within said cap fixedly mounts a third annular bushing concentrically surrounding said shaft and having an inner diameter on the order of the shaft diameter for rotatingly supporting said shaft adjacent the upper end of said cap, and means fixedly mounting said cap to said reduced diameter portion of the upper casing section to form a sealed assembly such that said shaft, via said cage, is rotatably mounted by three axially spaced annular bushings to prevent deflection of said shaft as a result of forces developed by the inlet flow acting impinging against said valve actuator assembly in the vicinity of said cage.

6. The gate valve as claimed in claim 5 wherein,
the upper counter bore within the reduced diameter portion of said upper casing section terminates in a downwardly and radially inward conical surface, said upper counter bore within said reduced diameter portion of said upper casing section is open to the lower counter bore within said cap, packing material is provided within the upper counter bore of said reduced diameter portion of said upper casing section and a coil spring under compression, concentrically surrounds said shaft, and is positioned within the lower counter bore of said cover in end abuttment with said packing to form a spring biased seal about said drive shaft in the area of the interface between said cover and said reduced diameter portion of said upper casing section.

7. The gate valve as claimed in claim 6, wherein,
said actuator assembly shaft terminates at the end remote from the cage in an annular groove above the upper end of said cap, forming a radial collar, a washer is mounted on said shaft and impinges against the upper face of the annular bushing mounted within the upper counterbore within said cap, and a cir-clip is mounted on said shaft, above said washer and within said annular groove for locking said drive shaft in position on said cover and maintaining said shaft, said arm, said cage and said pin in proper position with respect to said valve casing, and the lower end of the pin within the recess within the upper face of said valve disk.

8. The gas valve is claimed in claim 1, wherein, said casing includes an upper casing section of cylindrical form having an axis coaxial with said inlet port, a bore having a diameter slightly larger than that of said shaft, said drive shaft projecting through said bore, a counter bore within said casing cylindrical portion to the side of said bore remote from said cage, said cylindrical portion being threaded on its outer periphery a cup shaped packing adjustment collar including a flat top wall, and a cylindrical wall having a threaded inner periphery and being sized to and threaded onto the end of said casing cylindrical wall and having an axial hole receiving an end of said drive shaft with a drive shaft being rotable therein, and a bearing mounted between the end of said cylindrical section and said cup shaped packing adjustment collar, having an axial bore sized slightly larger than the diameter of said drive shaft, being concentric with said drive shaft and rotably mounting said drive shaft for rotation about the shaft's axis and wherein, said packing adjustment collar has an annular portion projecting within said counter bore facing said packing within said counter bore and means for permitting said bearing to move axially during rotation of said packing adjustment collar to permit the packing to be compressed within said counter bore by said annular portion of said bearing but preventing rotation of said bearing relative to said casing and said packing adjustment collar.

9. The gate valve as claimed in claim 8 wherein, said bearing is of T-shape in cross section and includes a radially enlarged rim which overlies the end of said upper casing section cylindrical wall, remote from said inlet port and said anti-rotation means comprises a pair of diametrically oppose holes projecting parallel to the axis of the upper casing section within the end face of said cylindrical wall remote from the inlet port, and wherein, a pair of pins are fixed to and project outwardly of the annular rim and are positioned received by and sized to said diametrically opposed holes within the end wall of said upper casing section cylindrical portion such that the pins permit said outer bearing to move axially relative to said valve casing while preventing rotation of said outer bearing relative to said valve casing during rotation of the packing adjustment collar.

10. The gate valve is claimed in claim 9 further comprising a radial hole within said upper casing section cylindrical wall at the threaded portion thereof, and a cylindrical block of nylon is mounted within said radial hole and has an end contacting the threaded inner periphery of said packing adjustment collar and functioning to lock the packing adjustment collar at an axially adjusted position on said upper casing section cylindrical portion with the packing compressed by the annular portion projecting within said counter bore and in contact therewith.

11. The gate valve is claimed in claim 1 wherein, said radially projecting arm, remote from said shaft terminates in an integral, hollow cylindrical pin projecting at right angles to said arm, to the side of said cage and parallel thereto, said hollow cylindrical pin being open at opposite ends, said swingable gate valve disk having a circular recess within one side thereof sized to and receiving the open end of said hollow cylindrical pin remote from said arm, and wherein, said gate valve further comprises a pair of cup shaped cylindrical caps having an outside diameter which is less than the inside diameter of said hollow cylindrical pin and being positioned therein and having open ends facing each other, and a compression coil spring interposed between said caps and having opposite ends positioned within the open ends of said caps, such then said caps respectively face and abut, under the bias of the compression coil spring, said valve casing and said valve disk respective to prevent side loading of said arm during movement of said swingable gate valve disk between positions covering and uncovering said outlet port.

12. The gate valve as claimed in claim 11, wherein, said gate valve disk recess within the face thereof proximate to said arm, has a conical bottom wall ensuring point contact between the cap in contact therewith and the valve disk.

13. The gate valve as claimed in claim 11, wherein, the face of said valve disk remote from said arm contacts and overlies said outlet port, is flat, and includes a spherical recess therein which is eccentric to the axis of the circular valve disk such that, during movement of said swingable gate valve disk between positions covering and uncovering the outlet port, the valve disk rotates about its axis to ensure even wearing of the surface of the face thereof, remote from said arm and constituting the sealing surface for said valve disk.

* * * * *